United States Patent
Reddy

(10) Patent No.: US 10,287,480 B1
(45) Date of Patent: *May 14, 2019

(54) SETTABLE, FORM-FILLING LOSS CIRCULATION CONTROL COMPOSITIONS COMPRISING IN SITU FOAMED NON-HYDRAULIC SOREL CEMENT SYSTEMS AND METHOD OF USE

(71) Applicant: Saudi Arabian Oil Company, Dhahran (SA)

(72) Inventor: B. Raghava Reddy, Pearland, TX (US)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 16/137,911

(22) Filed: Sep. 21, 2018

Related U.S. Application Data

(63) Continuation of application No. 15/879,169, filed on Jan. 24, 2018, now Pat. No. 10,150,905.

(51) Int. Cl.
| | |
|---|---|
| *C09K 8/473* | (2006.01) |
| *C09K 8/487* | (2006.01) |
| *E21B 33/13* | (2006.01) |

(52) U.S. Cl.
CPC .............. *C09K 8/487* (2013.01); *C09K 8/473* (2013.01); *E21B 33/13* (2013.01)

(58) Field of Classification Search
CPC .......... C09K 8/487; C09K 8/473; E21B 33/13
See application file for complete search history.

(56) References Cited

U.S. PATENT DOCUMENTS

| | | |
|---|---|---|
| 4,450,010 A | 5/1984 | Burkhalter et al. |
| 4,466,833 A | 8/1984 | Spangle |
| 5,996,693 A | 12/1999 | Heathman |
| 6,715,553 B2 | 4/2004 | Reddy et al. |
| 6,722,434 B2 | 4/2004 | Reddy et al. |
| 6,858,566 B1 | 2/2005 | Reddy et al. |
| 6,992,048 B2 | 1/2006 | Reddy et al. |
| 7,156,175 B2 | 1/2007 | Reddy et al. |
| 7,288,147 B2 | 10/2007 | Christensen et al. |
| 7,642,223 B2 | 1/2010 | Santra et al. |
| 7,922,808 B2 | 4/2011 | Brower et al. |
| 8,689,871 B2 | 4/2014 | Khatri et al. |
| 10,150,905 B1 | 12/2018 | Reddy |
| 2004/0168801 A1 | 9/2004 | Reddy |
| 2014/0076204 A1 | 3/2014 | Brenneis |
| 2014/0131042 A1 | 5/2014 | Nguyen et al. |
| 2014/0318786 A1 | 10/2014 | Vidma et al. |
| 2017/0107420 A1 | 4/2017 | Terrier et al. |

FOREIGN PATENT DOCUMENTS

| | | |
|---|---|---|
| CN | 105859244 | 8/2016 |

*Primary Examiner* — Anthony J Green
(74) *Attorney, Agent, or Firm* — Fish & Richardson P.C.

(57) ABSTRACT

This document relates to settable, non-hydraulic foamed cement compositions comprising nitrogen gas-generating compositions used for loss circulation control.

13 Claims, 1 Drawing Sheet

SETTABLE, FORM-FILLING LOSS CIRCULATION CONTROL COMPOSITIONS COMPRISING IN SITU FOAMED NON-HYDRAULIC SOREL CEMENT SYSTEMS AND METHOD OF USE

CROSS-REFERENCE TO RELATED APPLICATIONS

This application is a continuation application of and claims priority to U.S. application Ser. No. 15/879,169, filed on Jan. 24, 2018, now issued as U.S. Pat. No. 10,150,905 on Dec. 11, 2018, and which is hereby incorporated by reference in entirety.

TECHNICAL FIELD

This document relates to settable, non-hydraulic foamed cement compositions comprising nitrogen gas-generating compositions used for loss circulation control.

BACKGROUND

Natural resources such as gas, oil, and water in a subterranean formation are usually produced by drilling a well bore down to a subterranean formation while circulating a drilling fluid in the wellbore. Fluids used in drilling, completion, or servicing of a wellbore can be lost to the subterranean formation while circulating the fluids in the wellbore. In particular, the fluids may enter the subterranean formation via depleted zones, zones of relatively low pressure, loss circulation zones having naturally occurring fractures, weak zones having fracture gradients exceeded by the hydrostatic pressure of the drilling fluid, and so forth.

One of the contributing factors may be lack of precise information on the dimensions of loss circulation areas, which can range from microfractures to vugular zones. Depending on the extent of fluid volume losses, loss circulation is classified as seepage loss, moderate loss, or severe loss. For oil-based fluids, losses of 10-30 barrels per hour are considered moderate, and losses greater than 30 barrels per hour are considered severe. For water-based fluids, losses between 25 and 100 barrels are considered moderate, and losses greater than 100 barrels are considered severe. For severe losses, the dimensions of the loss circulation zones cannot be estimated which makes it difficult to design loss circulation treatment pills based on the sized particles. The revenue loss due to loss circulation materials (LCM) problems extends into tens of millions of dollars.

Loss circulation treatments involving various plugging materials have been used to prevent or lessen the loss of fluids from wellbores. The ideal loss circulation treatment solution will have to be adaptable to any dimension or shape of the loss circulation zone. Thus, there is a need for a composition that can form-fill upon placement, irrespective of the shape and size of the thief zone.

SUMMARY

Provided in this disclosure is a non-hydraulic, foamed cementitious composition that includes magnesium oxide (MgO); a salt selected from the group consisting of magnesium chloride ($MgCl_2$), magnesium sulfate ($MgSO_4$), ammonium hydrogen phosphate ($NH_4H_2PO_4$), and hydrates thereof; a nitrogen gas-generating compound; and a foam surfactant.

In some embodiments, the salt is magnesium chloride hexahydrate ($MgCl_2.6H_2O$).

In some embodiments, the foam surfactant is selected from the group consisting of an alkyl sulfate salt with a $C_{12}$-$C_{14}$ carbon chain, a betaine, a hydroxysultaine and any combination thereof. In some embodiments, the foam surfactant is cocoamidopropyl hydroxysultaine.

In some embodiments, the nitrogen gas-generating compound is an azo compound. In some embodiments, the azo compound is azodicarbonamide. In some embodiments, the azo compound is about 1% to about 10% by weight of the MgO.

In some embodiments, the composition includes an amine activator selected from the group consisting of carbohydrazide (CHZ), tetraethylenepentamine (TEPA), and hydrazine sulfate. In some embodiments, the weight ratio of the azo compound to the amine activator is about 5:1 to about 1:5. In some embodiments, the amine activator is CHZ.

In some embodiments, the composition includes an oxidizer.

In some embodiments, the composition includes a set retarder selected from the group consisting of hexametaphosphate, sodium borate, sodium citrate, citric acid, and an aminophosphonate.

In some embodiments, the composition includes a viscosifier.

In some embodiments, the pH of the final foamed cementitious composition is greater than about 4.

Also provided in this disclosure is a non-hydraulic, foamed cementitious composition that includes magnesium oxide (MgO); a salt selected from the group consisting of magnesium chloride ($MgCl_2$), magnesium sulfate ($MgSO_4$), ammonium hydrogen phosphate ($NH_4H_2PO_4$), and hydrates thereof; a hydrazide or a semi-carbazide; an oxidizer; and a foam surfactant.

In some embodiments, the oxidizer is selected from the group consisting of peroxide, persulfate, percarbonate, perbromate, perborate salts of ammonium, alkali earth metals, and alkaline earth metals. In some embodiments, the weight ratio of the hydrazide or semi-carbazide to the oxidizer is about 1:0.25 to about 1:5.

In some embodiments, the composition includes a viscosifier.

Also provided herein is a method of treating a subterranean formation, for example, a lost circulation zone, the method including: a) forming a foamed cementitious composition that includes magnesium oxide (MgO); a salt selected from the group consisting of magnesium chloride ($MgCl_2$), magnesium sulfate ($MgSO_4$), ammonium hydrogen phosphate ($NH_4H_2PO_4$), and hydrates thereof; a nitrogen gas-generating compound; and a foam surfactant; and b) introducing the foamed cementitious composition into the well.

In some embodiments, the nitrogen gas-generating compound is an azo compound. In some embodiments, the azo compound is about 1% to about 10% by weight of the MgO.

In some embodiments of the method, the composition includes an amine activator selected from the group consisting of carbohydrazide (CHZ), tetraethylenepentamine (TEPA), and hydrazine sulfate. In some embodiments, the weight ratio of the azo compound to the amine activator is about 5:1 to about 1:5.

Also provided herein is a method of treating a lost circulation zone fluidly connected to a wellbore, the method including: a) forming a foamed cementitious composition that includes magnesium oxide (MgO); a salt selected from the group consisting of magnesium chloride ($MgCl_2$), magnesium sulfate ($MgSO_4$), ammonium hydrogen phosphate ($NH_4H_2PO_4$), and hydrates thereof; a hydrazide or a semi-carbazide; an oxidizer; and a foam surfactant; and b) introducing the foamed cementitious composition into the well, and subsequently into the lost circulation zone.

In some embodiments, the oxidizer is selected from the group consisting of peroxide, persulfate, percarbonate, perbromate, perborate salts of ammonium, alkali earth metals, and alkaline earth metals. In some embodiments, the weight ratio of the hydrazide or semi-carbazide to the oxidizer is about 1:0.25 to about 1:5.

DETAILED DESCRIPTION

Figure 1:
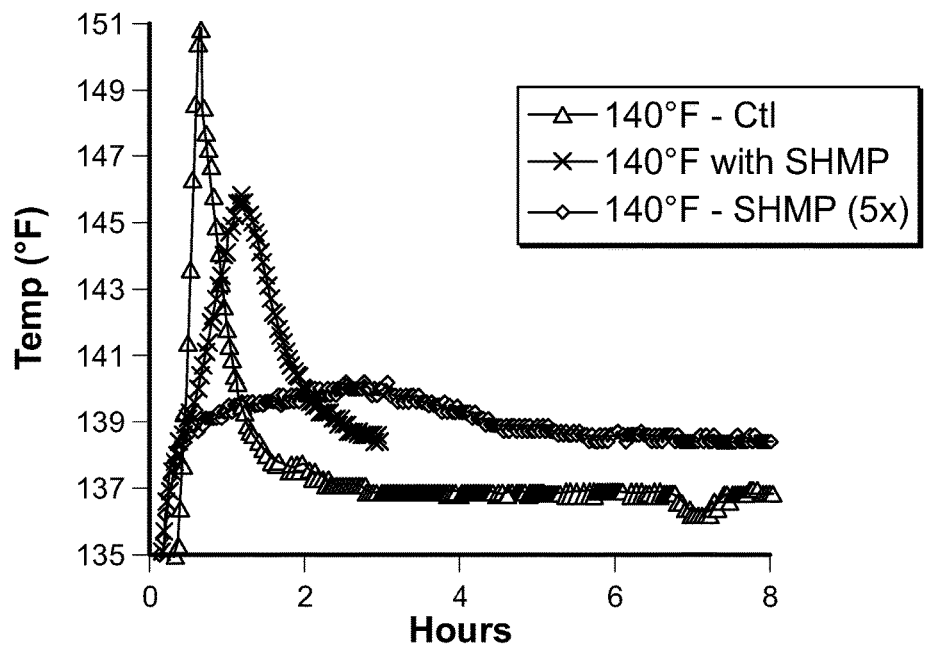
FIG. 1 shows set times of compositions that include SHMP as a set retarder.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

As used herein, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

As used herein, a "cement" is a binder, for example, a substance that sets and forms a cohesive mass with measurable strengths. A cement can be characterized as non-hydraulic or hydraulic. Non-hydraulic cements (e.g., Sorel cements) harden because of the formation of complex hydrates and carbonates, and may require more than water to achieve setting, such as carbon dioxide or mixtures of specific salt combinations. Additionally, too much water cannot be present, and the set material must be kept dry in order to retain integrity and strength. A non-hydraulic cement produces hydrates that are not resistant to water. If the proportion of water to a non-hydraulic cement is significantly higher than the stoichiometric amounts of water, the cement composition will not set into a hardened material. "Stoichiometric amounts of water" is defined as the amount of water required to form the structures of the final products containing specific amounts of water, for example as water of crystallization. Hydraulic cements (e.g., Portland cement) harden because of hydration, which uses only water in addition to the dry cement to achieve setting of the cement. Cement hydration products, chemical reactions that occur independently of the mixture's water content can harden even underwater or when constantly exposed to wet weather. The chemical reaction that results when the dry cement powder is mixed with water produces hydrates that have extremely low solubility in water.

As used herein, a "cementitious composition" can refer to a non-hydraulic Sorel cement composition, which can include, in addition to water, mixtures of near stoichiometric quantities of magnesium oxide and a salt, to set. A cementitious composition can also include additives. The cementitious compositions described herein can include water and/or be mixed with water. Depending on the type of cement, the chemical proportions, when a cement composition is mixed with water, it can begin setting to form a single phase solid material.

As used herein, the term "set" can mean the process of a fluid slurry becoming a hard solid. Depending on the composition and the conditions, it can take just a few minutes up to 72 hours or longer for some cement compositions to initially set.

As used herein, a "retarder" can be a chemical agent used to increase the thickening time of a cement composition. The need for retarding the thickening time of a cement composition tends to increase with depth of the zone to be cemented due to the greater time required to complete the cementing operation and the effect of increased temperature on the setting of the cement. A longer thickening time at the design temperature allows for a longer pumping time that may be required.

The term "alkyl" as used herein can refer to straight chain and branched alkyl groups and cycloalkyl groups having from 1 to about 40 carbon atoms, 1 to about 20 carbon atoms, 1 to about 12 carbons or, in some embodiments, from 1 to about 8 carbon atoms. Examples of straight chain alkyl groups include those with from 1 to about 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "amine" as used herein can refer to primary, secondary, and tertiary amines having, e.g., the formula N(group)$_3$ wherein each group can independently be H or non-H, such as alkyl, aryl, and the like. Amines include, but are not limited to, RNH$_2$, for example, alkylamines, arylamines, alkylarylamines; R$_2$NH wherein each R is independently selected from, for example, dialkylamines, diarylamines, aralkylamines, heterocyclylamines and the like; and R$_3$N wherein each R is independently selected from, for example, trialkylamines, dialkylarylamines, alkyldiarylamines, triarylamines, and the like.

The term "amino group" as used can herein refer to a substituent of the form —NH$_2$, —NHR, —NR$_2$, wherein each R is independently selected, and protonated forms of each. Accordingly, any compound substituted with an amino group can be viewed as an amine. An "amino group" within the meaning herein can be a primary, secondary, or tertiary amino group. An "alkylamino" group includes a monoalkylamino, dialkylamino, and trialkylamino group.

The term "room temperature" as used herein can refer to a temperature of about 15° C. to about 28° C.

As used herein, the term "polymer" can refer to a molecule having at least one repeating unit and can include copolymers.

The term "downhole" as used herein can refer to under the surface of the earth, such as a location within or fluidly connected to a wellbore.

As used herein, the term "fluid" can refer to liquids and gels, unless otherwise indicated.

As used herein, the term "drilling fluid" can refer to fluids, slurries, or muds used in drilling operations downhole, such as during the formation of the wellbore.

As used herein, the term "cementing fluid" can refer to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "subterranean material" or "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

Compositions and Reaction Products Thereof

Provided in this disclosure are settable, non-hydraulic cement compositions comprising nitrogen-gas generating compositions. The foamed cementitious compositions can form-fill upon placement, irrespective of the shape and size of the thief zone, to cure loss circulation problems. The foamed compositions can set up to hard masses to withstand hydrostatic pressures from wellbore fluids without requiring extensive foam equipment that can involve cryogenic nitrogen and the associated machinery. The compositions described herein are in situ foaming compositions that include fast-setting Sorel cement compositions. Sorel cement compositions typically contain magnesium oxide and a soluble magnesium salt, such as magnesium chloride and magnesium sulfate, or a phosphate salt such as sodium or ammonium hydrogen phosphate. Such cements are individually referred to as magnesium oxychloride (MOC), magnesium oxysulfate (MOS) and magnesium oxyphosphate (MOP) cement systems, and collectively as Sorel cements. Provided herein are Sorel cement-based slurries that are foamed with in situ generated nitrogen gas. The gas is generated by a nitrogen gas-generating compound. In some embodiments, the compositions comprise an activator or accelerator compound that can accelerate generation of gas from the gas-generating compound.

Provided in this disclosure is a foamed cementitious composition including magnesium oxide (MgO), a salt, a nitrogen gas-generating compound, and a foam surfactant. Also provided in this disclosure is a foamed cementitious composition that includes magnesium oxide, a salt, a hydrazide or semi-carbazide, an oxidizer, and a foam surfactant.

In some embodiments, the non-hydraulic foamed cement compositions described herein include Sorel cements which are a combination of magnesium oxide, a magnesium salt, and water. Sorel cement (also known as magnesia cement) is a non-hydraulic cement that is typically a mixture of magnesium oxide (burnt magnesia) and a magnesium salt, such as magnesium chloride, that when mixed with water hardens and sets. Without being limited by any theory, it is believed that the main products formed in Sorel cements based on magnesium chloride and magnesium oxide include magnesium hydroxide (Mg(OH)$_2$), a 3-form magnesium oxychloride of the composition 3Mg(OH)$_2$. MgCl$_2$.8H$_2$O, and a 5-form magnesium oxychloride product of the composition 5Mg(OH)$_2$. MgCl$_2$.8H$_2$O. The 5-form product has superior mechanical properties and is the primary product formed when the molar ratio of its components MgO: MgCl$_2$:H$_2$O is about 5:1:13, when there is a slight excess of MgO and an amount of water required to form the 5-form and to convert any excess MgO into Mg(OH)$_2$. For the 3-form, the molar ratio of MgO:MgCl$_2$:H$_2$O is 3:1:11.

The magnesium salts in the foamed cementitious compositions described herein can include, for example, magnesium chloride (MgCl$_2$) or magnesium sulfate (MgSO$_4$). In some embodiments, the Sorel cement compositions described herein include compositions containing magnesium oxide, a sodium or ammonium hydrogen phosphate, and water.

In some embodiments, the salt is a magnesium salt, a sodium phosphate salt, an ammonium phosphate salt, or hydrates thereof. In some embodiments, the salt is a magnesium salt or hydrate thereof selected from magnesium chloride (MgCl$_2$) and magnesium sulfate (MgSO$_4$). In some embodiments, the salt is magnesium chloride or a magnesium chloride hydrate with the formula MgCl$_2$ (H$_2$O)$_x$. In some embodiments, the salt is magnesium chloride hexahydrate, with the formula MgCl$_2$ (H$_2$O)$_6$ or MgCl$_2$.6H$_2$O. In some embodiments, the salt is magnesium sulfate. In some embodiments, the salt is a sodium phosphate salt selected from among a monosodium phosphate salt and a disodium phosphate salt. In some embodiments, the salt is monosodium dihydrogen phosphate. In some embodiments, the salt is an ammonium dihydrogen phosphate salt.

In some embodiments, the molar ratio of magnesium oxide to soluble salt is between about 1:0.5 to 6:1.

In some embodiments, the nitrogen gas-generating compound is selected from among an azo compound, a hydrazide, a semi-carbazide, and combinations thereof. In some embodiments the azo compound is a derivative of azodicarboxylic acid with the formula:

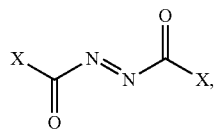

where X is independently selected from among NH$_2$, a monoalkylamino group, a dialkylamino group, OH, O$^-$M$^{n+}$ (where M$^{n+}$ is an alkali or alkaline earth metal), alkyl, aryl, or an alkoxy group. In some embodiments, the azodicarboxylic acid derivative is selected from among an amide derivative, an ester derivative, and an alkali salt of the carboxylic derivative. In some embodiments, the nitrogen gas-generating azodicarboxylic acid derivative is azodicarbonamide (AZDC) with the structure:

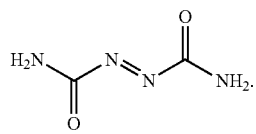

In some embodiments, the nitrogen gas-generating azodicarboxylic acid derivative is an ester selected from among diisopropyl azodicarboxylate (DIAD) and diethyl azodicarboxylate (DEAD) represented by the structures:

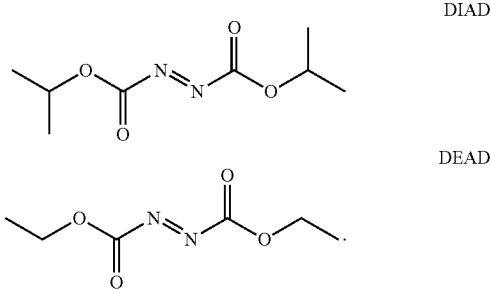

In some embodiments, the azo compound is toluene sulfonyl hydrazide with the structure:

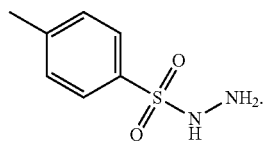

In some embodiments, the nitrogen gas-generating compound is a hydrazide with the structure:

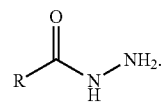

In some embodiments, the hydrazide is carbohydrazide (CHZ) and R is NHNH$_2$. In some embodiments, the hydrazide is p-toluenesulfonyl hydrazide.

In some embodiments, the nitrogen gas-generating compound is a semi-carbazide with the structure:

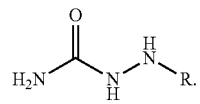

In some embodiments, the semi-carbazide is an unsubstituted semi-carbazide and R is H (i.e., hydrazinecarboxamide).

In some embodiments, the compositions described herein include an azo compound and a hydrazide. In some embodiments, the compositions described herein include AZDC and CHZ.

In some embodiments, the foamed cementitious composition includes a nitrogen gas-generating compound in an amount of about 0.1% to about 20% by weight of the MgO. For example, the nitrogen gas-generating compound can be about 1% to about 10% by weight of the MgO or about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 16%, 17%, 18%, 19%, or about 20% by weight of the MgO.

In some embodiments, the foam surfactant is selected from among an alkyl sulfate salt, an alpha-olefin sulfonate, a betaine, a hydroxysultaine, and an amine oxide, and combinations thereof. In some embodiments, the alkyl sulfate salt has an alkyl chain that is a $C_{12}$-$C_{14}$ carbon chain, such as sodium dodecyl sulfate. In some embodiments, the foam surfactant is cocoamidopropyl hydroxysultaine. In some embodiments, the foam surfactant is a combination of alkyl sulfate salt and cocoamidopropyl hydroxysultaine.

In some embodiments, the foam surfactant is present in an amount of about 30 wt % to about 50 wt % in an aqueous solution. In some embodiments, the foam surfactant is in an aqueous solution containing a water soluble alcohol, for example isopropyl alcohol. In some embodiments, the foam surfactant is about 30% to about 50% by weight in the aqueous solution. For example, the foam surfactant can be about 30%, 35%, 40%, 45%, or about 50% by weight in the aqueous solution. In some embodiments, the foam surfactant is a 44 wt % solution of cocoamidopropyl hydroxysultaine in water.

In some embodiments, the surfactant or combination of surfactants is added in about 1% to about 10% by volume of the mix water used to make the cement composition. In some embodiments, the surfactant solution is added in about 2%, 3%, 4%, 5%, 6%, 7%, 8%, 9%, or about 10% by volume of the mix water used to make the cement composition.

In some embodiments, the foamed cementitious composition includes an amine activator or accelerator compound. The amine activator/accelerator compound can be used to accelerate the generation of gas from the nitrogen gas-generating compound. In some embodiments, the amine activator is selected from among a hydrazide, a hydrazine, and an ethyleneamine. Examples of suitable ethyleneamines include ethylenediamine (EDA), diethylenetriamine (DETA), triethylenetetramine (TETA), and tetraethylenepentamine (TEPA). In some embodiments, the amine activator is TEPA. In some embodiments, the hydrazine is a hydrazine salt. In some embodiments, the amine activator is hydrazine sulfate. In some embodiments, the amine accelerator compound is a hydrazide with the structure:

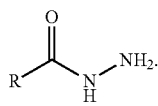

In some embodiments, the hydrazide is carbohydrazide (CHZ) and R is $NHNH_2$. In some embodiments, the amine activator compound is a semi-carbazide with the structure:

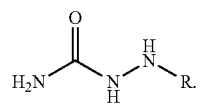

In some embodiments, the semi-carbazide is an unsubstituted semi-carbazide and R is H (i.e., hydrazinecarboxamide). In some embodiments, the hydrazide is p-toluenesulfonyl hydrazide. In some embodiments, the compositions described herein include an azo compound and a hydrazide. In some embodiments, the amine activator is carbohydrazide (CHZ). In some embodiments, the composition comprises a nitrogen gas-generating compound that is an azo compound and an amine activator. In some embodiments, the composition comprises AZDC and CHZ. In some embodiments, the composition comprises AZDC and TEPA. In some embodiments, the composition comprises AZDC and hydrazine sulfate.

In some embodiments, the weight ratio of the nitrogen gas-generating compound to the amine activator is about 20:1 to about 1:20, such as about 10:1 to about 1:10, or about 5:1 to about 1:5. For example, the weight ratio of the nitrogen gas-generating compound to the amine activator can be about 5:1 to about 1:5, about 5:1 to about 1:4, about 5:1 to about 1:3, about 5:1 to about 1:2, about 5:1 to about 1:1, or about 5:1, 4:1, 3:1, 2:1, 1:1, 1:2, 1:3, 1:4, or about 1:5. In some embodiments, the nitrogen gas-generating compound is an azo compound. In some embodiments, the azo compound is AZDC.

In some embodiments, the foamed cementitious composition includes an oxidizing compound (oxidizer). In some embodiments, the oxidizing compound is selected from among a peroxide, a persulfate, a percarbonate, a perbromate, a perborate salt of ammonium, an alkali earth metal, and an alkaline earth metal. In some embodiments, the oxidizing compound is selected from among potassium persulfate, sodium persulfate, magnesium peroxide, encapsulated potassium persulfate, and encapsulated potassium bromate compounds. In some embodiments, the oxidizing compound is potassium persulfate. In some embodiments, the oxidizing compound is magnesium peroxide. In some embodiments, the oxidizing compound is encapsulated potassium persulfate. In some embodiments, the amine activator can generate additional nitrogen by themselves in the presence of an oxidizing compound. In some embodiments, carbohydrazide can generate additional nitrogen in the presence of an oxidizing compound. In some embodiments, hydrazine sulfate can generate additional nitrogen in the presence of an oxidizing compound. In some embodiments, the composition comprises CHZ and potassium persulfate. In some embodiments, the composition comprises CHZ and magnesium peroxide. In some embodiments, the composition comprises CHZ and encapsulated potassium persulfate.

In some embodiments, the oxidizing compound is present in an amount of about 0.001 wt % to about 2 wt % of the magnesium oxide, or about 0.005 wt %, 0.01 wt %, 0.05 wt %, 0.1 wt %, 0.5 wt %, 1 wt %, 1.5 wt %, or about 2 wt % of the magnesium oxide. In some embodiments, the oxidizer is used in combination with a carbazide, a hydrazide, a semi-carbazide and hydrazine sulfate.

In some embodiments, the foamed cementitious composition includes a set retarder. In some embodiments, set times of Sorel cements at a given temperature can be controlled by set retarders. In some embodiments, the set retarder is selected from among a citrate salt, citric acid, sodium hexametaphosphate, aminomethylene organophosphonates, and sodium borate salts. In some embodiments, the set retarder is selected from among sodium hexametaphosphate (SHMP), sodium borate, sodium citrate, citric acid, sodium tetraborate and the pentasodium salt of amino tri(methylene phosphonic acid) ($Na_5ATMP$). An exemplary $Na_5ATMP$ salt includes Dequest 2006®, available as a 40% solution from Italmatch Chemicals (Red Bank, N.J.). In some embodiments, the set retarder is SHMP.

In some embodiments, the set retarder is present in an amount of 0.5 wt % to about 10 wt % of the magnesium oxide, or about 1 wt %, 2 wt %, 3 wt %, 4 wt %, 5 wt %, 6 wt %, 7 wt %, 8 wt %, 9 wt %, or about 10 wt % of the magnesium oxide. The amount of retarder is determined by lab experimentation by measuring the thickening times using a conventional equipment, such as a Cement Consistomer, at temperature and pressure conditions of the subterranean formation.

In some embodiments, the foamed cementitious composition includes a viscosifier, such as a polymeric viscosifier. In some embodiments, the viscosifier can prevent settling of the magnesium oxide. In some embodiments, the viscosifier can improve foam stability. In some embodiments, the viscosifier is selected from among xanthan, diutan and vinylphosphonic acid-grafted hydroxyethyl cellulose (HEC-VP). An exemplary HEC-VP includes Special Plug™, available as a 30 wt % polymer slurry in a non-aqueous polyol (Special Products Division of Champion Chemicals, TX). In some embodiments, the viscosifier is xanthan. In some embodiments, the viscosifier is HEC-VP. In some embodiments, the viscosifier is in an aqueous solution.

In some embodiments, the viscosifier is present in an amount of about 0.5 wt % to about 5 wt % of mix water used to prepare the cement composition. The amount of viscosifier is determined by lab experimentation by measuring the thickening times using a conventional equipment, such as a Cement Consistomer, at temperature and pressure conditions of the subterranean formation. In some embodiments, the viscosifier is in an aqueous solution. For example, the viscosifier can be about 0.1% to about 5% by weight of the mix water, such as about 0.1%, 0.5%, 0.6%, 0.7%, 0.8%, 0.9%, 1%, 2%, 2.5%, 3%, 4%, or about 5% by weight of a the mix water. In some embodiments, the viscosifier is diutan and is about 0.5 wt % of the mix water. In some embodiments, the viscosifier is xanthan and is about 0.6 wt % of the mix water. In some embodiments, the viscosifier is HEC-VP and is about 0.9 wt % of the mix water. In some embodiments, the mix water solution containing the viscosifier has a pH of 1.6. In some embodiments, the mix water solution containing the viscosifier has a pH of about 6-7.

Additional components that can be added to the cementitious compositions described herein include dispersants, set accelerators, settling prevention additives, water proofing chemicals such as organosiliconates and the like, cement extender/filler materials such as flyashes, slag, silica and sand, mechanical property modifiers such as fibers, latex materials, and rubber particles.

In some embodiments, the pH of the final foamed cementitious composition is about 4 or greater than about 4, for example about 4, 5, 6, 7, 8, 9, or greater. In some embodiments, the composition has a pH of greater than about 4 at the time the composition is placed in a well.

Also provided in this disclosure is a foamed cementitious composition that includes MgO, a magnesium chloride salt, azodicarbonamide, a hydroxysultaine, SHMP, xanthan, and an amine activator selected from among CHZ, TEPA, and hydrazine sulfate. In some embodiments, the amine activator is CHZ. In some embodiments, the amine activator is TEPA. In some embodiments, the amine activator is hydrazine sulfate.

Method of Treating a Subterranean Formation

Additionally, provided in this disclosure is a method of treating a subterranean formation. In some embodiments, the subterranean formation is a lost circulation zone. The method includes forming a foamed cementitious composition described herein, and introducing the foamed cementitious composition into the subterranean formation. In some embodiments, the composition includes magnesium oxide (MgO); a salt selected from among magnesium chloride ($MgCl_2$), magnesium sulfate ($MgSO_4$), ammonium hydrogen phosphate ($NH_4H_2PO_4$), and hydrates thereof; a nitrogen gas-generating compound; and a foam surfactant; and introducing the foamed cementitious composition into the subterranean formation.

In some embodiments, the nitrogen gas-generating compound is an azo compound. In some embodiments, the azo compound is about 1% to about 10% by weight of the MgO.

In some embodiments, the composition includes an amine activator selected from among carbohydrazide (CHZ), tetraethylenepentamine (TEPA), and hydrazine sulfate. In some embodiments, the weight ratio of the azo compound to the amine activator is about 5:1 to about 1:5.

Also provided is a method of treating a subterranean formation, such as a lost circulation zone, that includes forming a foamed cementitious composition that includes MgO; a salt selected from among magnesium chloride ($MgCl_2$), magnesium sulfate ($MgSO_4$), ammonium hydrogen phosphate ($NH_4H_2PO_4$), and hydrates thereof; a hydrazide or a semi-carbazide; an oxidizer; and a foam surfactant; and introducing the foamed cementitious composition into the lost circulation zone.

In some embodiments, the oxidizer is selected from among peroxide, persulfate, percarbonate, perbromate, perborate salts of ammonium, alkali earth metals, and alkaline earth metals.

In some embodiments, the weight ratio of the hydrazide, carbazide, semi-carbazide or hydrazine sulfate to the oxidizer is about 1:0.25 to about 1:5.

The cementitious compositions described herein can be prepared by mixing the cementitious solids with mix water which can be fresh water, sea water, or brine. The mix water can be premixed with gas generating materials, retarders or other additives intended for slurry or set cement property manipulation to meet the requirements. Dry cement powders, or blends mixed with solid additives are added to mix stirring at agitation speeds recommended by American Petroleum Institute guidelines where appropriate. Liquid additives are injected into the mix water or into the slurry during or after slurry preparation or while pumping the slurry downhole. Such liquid additives may include foaming compositions, foaming surfactants, oxidizers or retarders and the like. After placing the foamed composition in the zone of interest, the composition is typically allowed to set for at least 24 hours before conducting further operations such as drilling, cementing, or wellbore cleanup.

Also provided herein is a method of servicing a wellbore. The method includes providing a foamed cementitious composition including magnesium oxide (MgO); a salt selected from the group consisting of magnesium chloride ($MgCl_2$), magnesium sulfate ($MgSO_4$), ammonium hydrogen phosphate ($NH_4H_2PO_4$), and hydrates thereof; a nitrogen gas-generating compound; and a foam surfactant, within a portion of at least one of a wellbore and a subterranean formation.

Also provided herein is a method of servicing a loss circulation zone fluidly connected to a wellbore that includes providing a foamed cementitious composition including magnesium oxide (MgO); a salt selected from the group consisting of magnesium chloride ($MgCl_2$), magnesium sulfate ($MgSO_4$), ammonium hydrogen phosphate ($NH_4H_2PO_4$), and hydrates thereof; a hydrazide or a semi-carbazide; an oxidizer; and a foam surfactant, within a portion of at least one of a wellbore and a subterranean formation containing the lost circulation zone.

In some embodiments, the composition is introduced into at least one of a wellbore and a subterranean formation containing the lost circulation zone using a pump.

EXAMPLES

A series of magnesium chloride and magnesium oxide-based compositions, referred to as magnesium oxychloride cements (MOC), were tested as representative Sorel cement compositions, and described in Examples 1-6. The compositions were prepared by adding magnesium chloride and magnesium oxide to water along with the other ingredients in the required stoichiometric amounts and allowed to set in a closed, dry atmosphere. Alternately, magnesium brines were mixed with required amounts of magnesium oxide and allowed to set.

Other components of the compositions included: azodicarbonamide; an amine activator/accelerator compound, including carbohydrazide, tetraethylenepentamine (TEPA), and hydrazine sulfate; an oxidizing compound, including potassium persulfate, sodium persulfate, magnesium peroxide, encapsulated potassium persulfate, and encapsulated potassium bromate compounds; a foaming surfactant, including an alkyl sulfate salts, in which the alkyl group has C12-C14 carbon chain length, a betaine and a hydroxysultaine; a set retarder, including sodium hexametaphosphate (SHMP), sodium citrate, sodium tetraborate, and pentasodium salt of amino tri(methylene phosphonic acid) ($Na_5ATMP$) (Dequest 2006®, a 40% solution from Italmatch USA, Red Bank, N.J.); and a polymeric viscosifier, including xanthan, diutan, and vinylphosphonic acid-grafted cellulose (HEC-VP) (available as a 30 wt % polymer slurry in a non-aqueous polyol available from Special Products Division of Champion Chemicals, Texas under the trade name Special Plug). The diutan and xanthan solutions were prepared as 0.5 wt % and 0.6 wt % solutions, respectively, by dissolving the polymer is water with mild agitation to minimize shear induced polymer chain scission. The Special Plug product solution was prepared by stirring 12.5 mL of the polymer slurry in 400 mL water, followed by addition of 1.25 mL concentrated hydrochloric acid to obtain a 0.9% polymer solution with a pH of 1.6.

Example 1—Cement Compositions Containing a Gas Generating Compound and an Activator A stock solution containing 30 g magnesium chloride hexahydrate, 2 mL cocoamidopropyl hydroxysultaine (44% solution in water), and 4 g sodium hexametaphosphate in 50 mL of a 0.8 wt % xanthan solution was prepared. To this solution, 36 g of magnesium oxide and 1.75 g of azodicarbonamide was added with stirring. The density of the slurry was 1.46 g/cm³ (12.2 pounds per gallon, ppg). The slurry was divided into four 25 g (17 mL) portions and added to Humbolt cardboard cylinders. An activator, either carbohydrazide (CHZ), TEPA, or hydrazine sulfate, was added to each cylinder. The cylinders were kept in a water bath thermostated at 140° F. with no contact with water for 48 hr. The volume and gas volume of each sample was measured, and the results are shown in Table 1.

TABLE 1

| Composition | Activator | Activator amount (g) | Final vol. (mL) | Gas vol. (mL) | % gas vol. in set cement | Observations |
|---|---|---|---|---|---|---|
| 1a | None | 0 | 25 | 8 | 32 | Unstable foam layer on top |
| 1b | Carbohydrazide (CHZ) | 0.32 | 82 | 65 | 73 | Uniform foam |
| 1c | TEPA | 0.30 | 31 | 14 | 45 | Unstable foam on top |
| 1d | Hydrazine sulfate | 0.34 | 72 | 55 | 76 | Uniform foam |

The results showed that amine compounds functioned as activators for azodicarbonamide in the generation of nitrogen gas.

Example 2—Cement Compositions Containing a Gas Generating Compound and an Activator Magnesium chloride hexahydrate (60 g), 4 mL of a cocamidopropyl hydroxysultaine solution (44 wt %), 3.5 g azodicarbonamide, 8 g of sodium hexametaphosphate, and 72 g magnesium oxide were added to a stirred solution of 100 mL of 0.8% xanthan to obtain a slurry with a density of 1.49 g/cc (12.4 ppg). The slurry was divided into four batches and added to 2"×4" brass molds in the amounts shown in Table 2. Separately, a 30.3 wt % aqueous solution of carbohydrazide was prepared by dissolving 1 g of carbohydrazide in 2.0 mL water and 0.3 mL concentrated hydrochloric acid. The resulting solution contained 0.4 g carbohydrazide per gram of the solution. Variable amounts of the carbohydrazide solution were added to the slurries kept in the brass molds. The molds were kept in a water bath at 140° F. and allowed to set for 48 hrs. The volume of the set solid was measured and the amount of gas formed was calculated. The results are shown in Table 2.

TABLE 2

| Composition | Slurry vol. (mL) | AZDC in slurry (g) | CHZ added (g) | Final set solid vol. (mL) | Final set solid density (ppg) | Gas vol. Formed (mL) | % gas vol. in set solid |
|---|---|---|---|---|---|---|---|
| 2a | 35 | 0.68 | None | 73 | 5.8$^a$ | 38 | 52 |
| 2b | 42 | 0.83 | 0.2 | 180 | 2.9$^b$ | 138 | 77 |
| 2c | 42 | 0.83 | 0.4 | 180 | 2.9$^b$ | 138 | 77 |
| 2d | 43 | 0.85 | 0.6 | 160 | 3.3$^c$ | 117 | 73 |

$^a$Firm solid;
$^b$loose unconsolidated solid;
$^c$solid with mechanical integrity and uniform foaming

Example 3—Cement Composition Containing a Gas Generating Compound, Activator and Oxidizer Combination Using a 0.8% solution of HEC-VP as the viscosifier, a solution that contained 151 g magnesium chloride hexahydrate in 252 g of the viscosifier solution was prepared. The pH of the solution was 0.49. No significant heat increase was observed. Ten milliliters of cocoamidopropyl hydroxysultaine (44 wt %) solution was added. With vigorous stirring, 8.4 g AZDC was added and stirred for about 30 min until a uniform suspension was obtained. The pH of the suspension was 0.69. To this suspension, 8.4 g carbohydrazide (CHZ) was added with stirring. The pH of the resulting suspension was 4.2, indicating that CHZ activator increased the pH of the fluid. The density of the fluid was 1.16 g/cm³ (9.67 ppg). To 75 mL of the suspension, 37 g of magnesium oxide and 6.9 g of sodium hexametaphosphate was added with stirring. Gas began to form during the addition stage. To a second 75 mL portion of the suspension, 6.9 g of sodium hexametaphosphate was added and stirred. The pH of the suspension was 4.0. A mixture of 37 g magnesium oxide and 1.85 g potassium persulfate were added with stirring. Both of the reaction mixtures were kept at 140° F. for 10 minutes, and the densities of the foamed fluids were measured. The density of the fluid without the oxidizer was 0.45 g/cc (3.75 ppg) and that of the fluid containing oxidizer was 0.34 g/cc (2.83 ppg). From the measured densities of the foamed fluids, and the design density (1.47 g/cc or 12.3 ppg), the volume % of the gas in the foamed fluids was calculated to be 76% for the fluid without the oxidizer, and 81% for the fluid containing the oxidizer.

The results indicated that addition of an oxidizer increased the amount of gas generated when used in combination with AZDC and CHZ.

Example 4—Optimization of Oxidizer Structure and Concentration in Cement Compositions The following compositions were prepared by combining the components in the order listed in Table 3 below. The amounts of gas generated were determined by measuring the difference between the volume of the foamed slurry and the original slurry. The mixing viscosified fluid was 0.8 wt % HEC-VP used in amounts of 7.5 mL for each test. The compositions were kept at 150° F. overnight. The results are shown in Table 3.

TABLE 3

|  | 3a | 3b | 3c | 3d | 3e | 3f | 3g |
|---|---|---|---|---|---|---|---|
| $MgCl_2·6H_2O$ (g) | 4.5 | 4.5 | 4.5 | 4.5 | 4.5 | 4.5 | 4.5 |
| Surfactant[1] (mL) | 0.3 | 0.3 | 0.3 | 0.3 | 0.3 | 0.3 | 0.3 |
| AZDC (g) | — | 0.25 | 0.25 | — | — | 0.5 | 0.5 |
| CHZ (g) | 0.5 | 0.25 | 0.25 | 0.5 | 0.5 | — | — |
| MgO | 5 | 5 | 5 | 5 | 5 | 5 | 5 |
| $MgO_2$ (g) | — | — | — | — | 0.25 | — | — |
| $K_2S_2O_8$ (g) | 0.5 | 0.5 | 0.25 | 0.25 | 0.25 | 0.25 | — |
| Initial vol. (mL) | 12 | 12 | 12 | 12 | 12 | 12 | 12 |
| Final vol. (mL) | 40 | 60 | 60 | 35 | 30 | 25 | 23 |
| % gas vol. | 70[2] | 80 | 80 | 66 | 60 | 52 | 48 |

[1]Cocoamidopropyl hydroxysultaine
[2]In a separate experiment, the gas volume in the slurry was measured to be 45% at room temperature in one hour and reached 74% in 15 min at 150° F. Similar amounts were measured when the amount of potassium persulfate was reduced to 0.25 g.

The results in Table 3 indicated that AZDC by itself produced gas amounting to 50% by volume of the slurry when the amounts were 10% by weight of MgO. Addition of the oxidizer $K_2S_2O_8$ did not significantly increase the amounts of gas generated. Carbohydrazide, which functions as an activator for AZDC as shown in Tables 1 and 2, generated nitrogen gas by itself in the presence of the oxidizers $K_2S_2O_8$ or magnesium peroxide, which indicated that the hydrazide functionality was oxidized to nitrogen gas. The highest gas amounts were formed when a mixture of AZDC and CHZ was used in the presence of $K_2S_2O_8$. The increase in gas production from the mixture of AZDC and CHZ in the presence of $K_2S_2O_8$ was only slightly higher than in the absence of oxidizer, as evident by comparison with results shown in Tables 1 and 2.

In separate experiments, the effect of encapsulation of the oxidizer on the gas evolution rate was studied. Commercial samples of encapsulated potassium persulfate designed for slow and fast release rates were obtained. Additionally, encapsulated potassium bromate was also obtained from commercial sources.

Into 30 mL of a 0.8% HEC-VP solution in water, 18 g of $MgCl_2·6H_2O$, 1.3 mL of cocoamidopropyl hydroxysultaine, 1.0 g of carbohydrazide and 1.0 g of AZDC were added and stirred vigorously for 5 minutes to obtain a homogeneous suspension. The slurry was divided into three portions of 12.8 g each and placed into graduated centrifuge tubes. A mixture of 5.0 g magnesium oxide and 1.0 g of sodium hexametaphosphate was added and stirred. Into each slurry, the solid encapsulated oxidizer was added in amounts of 0.25 g, 0.5 g and 1.0 g, and the tubes were placed in oil baths kept at 140° F. The volume increases were measured for 15 minutes when the gas generation was complete. The results suggested that the degree of encapsulation of the oxidizer was insufficient to slow down the release of the oxidizer.

Example 5—Set Retarder Selection by Exothermicity of Reaction Measurements

Heat evolution reflected by an increase in temperature due to hydration/product formation was expected to reflect loss of fluidity of the slurry during placement. In a typical experiment, the slurry was prepared by dissolving 18 g $MgCl_2·6H_2O$ in 30 mL of an HEC-VP solution (0.8 wt % polymer). The slurry was divided into three portions of 12 g and each was placed in a centrifuge tube. Into one tube, 5 g of magnesium oxide was added. Into a second tube, a mixture of 5 g MgO and 0.2 g sodium hexametaphosphate (SHMP, 4% by wt of MgO) was added. Into the third tube a mixture of 5 g MgO and 1 g of SHMP (20% by wt of MgO—labeled as 5× in FIG. 1) was added. The contents of each tube were vigorously stirred with a spatula, and the centrifuge tubes were placed in preheated, thermostated oil baths connected to Brookfield viscometers. Thermocouples were inserted and the reaction temperatures were monitored as a function of time under quiescent conditions. Temperature increase due to heat evolution was measured.

In one set of experiments, the effect of retarder concentration at a selected temperature was measured. In another set of experiments, the effect of temperature on set time at a given concentration was measured. In another set of experiments, the effect of exothermic gas generation on the set times of slurries containing SHMP as the set retarder was studied. In this set of experiments, the slurry was prepared by dissolving 18 g $MgCl_2·6H_2O$ and 1.3 mL of cocoamidopropyl hydroxysultaine solution followed by addition of 1.0 g each of AZDC and CHZ. The slurry was divided into three portions of 12 g and each was placed in a centrifuge tube. To each slurry tube, a mixture of 5 g MgO, 1.0 g SHMP and variable amounts (0.3 g, 0.5 g and 0.75 g) of encapsulated potassium persulfate (labeled as EnCap KPXHT in FIG. 2) was added and vigorously stirred with a spatula. All sets of experiments were allowed to continue for at least 24 hrs at test temperature. The heat evolution due to gas generation and hydration/product formation was measured at different temperatures as described earlier. The results are shown in FIGS. 1 and 2.

Figure 2:
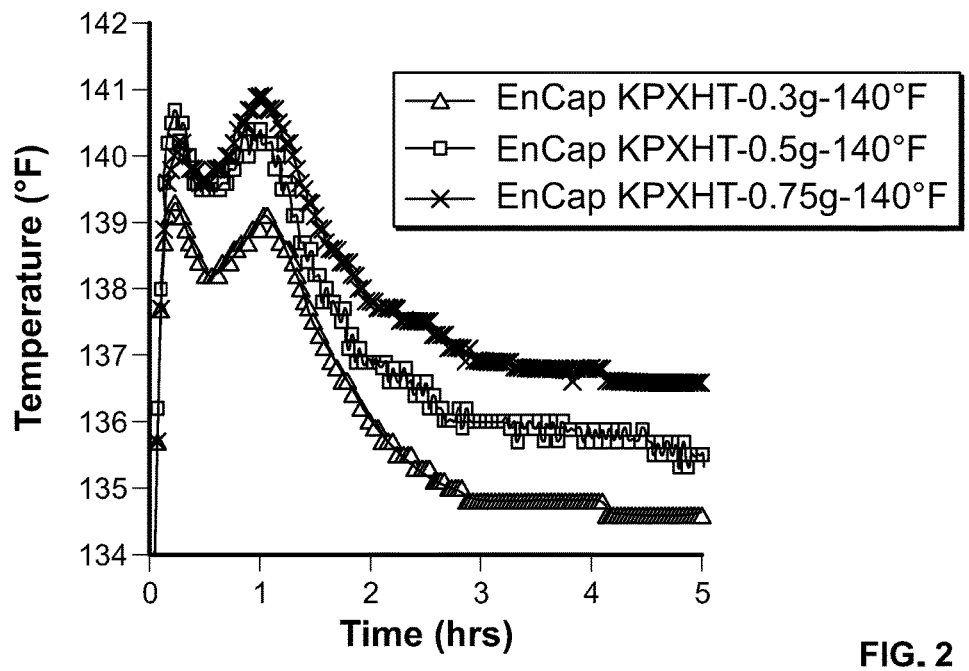
FIG. 2 shows heat evolution due to exothermic gas generation and cement setting in compositions that include gas generating components.

FIG. 1 shows that the set time could be controlled by SHMP as a set retarder. FIG. 2 shows that when the composition included gas generating components, two distinct heat evolution events took place, one of which was due to the exothermic gas generation and the other was due to cement setting. The exothermicity of the gas generation reduced the effectiveness of the retarder to provide longer set times, due to higher effective temperatures reached during the gas evolution (FIG. 2). The results shown in FIG. 2 also indicated that the gas evolution took place within the first 10-15 minutes at the reaction temperatures. In all sets of reactions performed, the slurries were soft to touch at the time of setting, but became hard set with high degree of stiffness in 24 hrs.

Other retarders were tested at 140° F. to compare the set times with SHMP in the presence of gas generating compositions. These retarders included sodium citrate, sodium borate (borax) and amino tri(methylene phosphonic acid) pentasodium salt ($Na_5ATMP$). Sodium borate and sodium citrate were added at 20% by weight of MgO, and $Na_5ATMP$ was added at 16% by wt of MgO. In all cases, the generation was complete in 30 minutes, as evident from the exothermic peak in heat evolution measurements. The set time was 5.2 hrs for sodium borate and longer than 6 hrs for the other two retarders. The 22 hr samples were hard set in the case of sodium borate and sodium citrate, but were soft set in the case of $Na_5ATMP$.

Example 6—Cement Compositions Containing Viscosifiers

In the absence of viscosifiers, the foam structure of the set solids was not uniformly forming alternate gas and solid layers. When viscosifiers were present, a uniform and stable foam structure was observed. Additionally, the solids with low solubility in water, such as magnesium oxide and AZDC, suspended well without settling.

In the preceding examples, 0.8% xanthan and HEC-VP solutions were employed as the mix fluids to prepare the compositions. The HEC-VP solutions were acidic (pH <2) due to the method of preparation, whereas the xanthan solutions were of neutral pH. It was found that when AZDC and an amine activator (e.g., carbohydrazide) were present together in xanthan or guar solutions, irrespective of the other components, gas generation was taking place prematurely, whereas in HEC-VP solutions there was no gas generation until the addition of magnesium oxide. Depending on the desired timing of gas generation and the desired solvent, a process modification that requires keeping AZDC and amine activator may be necessary. Alternately, when carbohydrazide was used in combination with an oxidizer as the AZDC-free gas generating composition, any viscosifier could be used without premature gas generation problems.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A foamed cementitious composition, comprising:
   magnesium oxide (MgO);
   magnesium chloride hexahydrate ($MgCl_2.6H_2O$);
   a nitrogen gas-generating compound; and
   a foam surfactant.

2. The composition of claim 1, wherein the foam surfactant is selected from the group consisting of an alkyl sulfate salt with a $C_{12}$-$C_{14}$ carbon chain, a betaine, and a hydroxysultaine.

3. The composition of claim 2, wherein the foam surfactant is cocoamidopropyl hydroxysultaine.

4. The composition of claim 1, wherein the nitrogen gas-generating compound is an azo compound.

5. The composition of claim 4, wherein the azo compound is azodicarbonamide.

6. The composition of claim 4, wherein the azo compound is about 1% to about 10% by weight of the MgO.

7. The composition of claim 4, further comprising an amine activator selected from the group consisting of carbohydrazide (CHZ), tetraethylenepentamine (TEPA), and hydrazine sulfate.

8. The composition of claim 7, wherein the weight ratio of the azo compound to the amine activator is about 5:1 to about 1:5.

9. The composition of claim 7, wherein the amine activator is CHZ.

10. The composition of claim 9, wherein the composition further comprises an oxidizer.

11. The composition of claim 1, further comprising a set retarder selected from the group consisting of hexametaphosphate, sodium borate, sodium citrate, citric acid, and an aminophosphonate.

12. The composition of claim 1, further comprising a viscosifier.

13. The composition of claim 1, wherein the pH of the foamed cementitious composition is greater than about 4.

* * * * *

UNITED STATES PATENT AND TRADEMARK OFFICE
CERTIFICATE OF CORRECTION

PATENT NO.       : 10,287,480 B1
APPLICATION NO.  : 16/137911
DATED            : May 14, 2019
INVENTOR(S)      : B. Raghava Reddy Page 1 of 1

It is certified that error appears in the above-identified patent and that said Letters Patent is hereby corrected as shown below:

In the Claims

Column 18, Line 20, Claim 3, delete "cocoamidopropyl" and insert -- cocamidopropyl --, therefor.

Signed and Sealed this
Third Day of March, 2020

Andrei Iancu
*Director of the United States Patent and Trademark Office*